Oct. 11, 1938.  E. MAX  2,133,204

FASTENER

Filed June 16, 1937

E. Max
INVENTOR

By: Glascock Downing & Seebold
ATTys.

Patented Oct. 11, 1938

2,133,204

UNITED STATES PATENT OFFICE 2,133,204

FASTENER

Ella Max, Paris, France

Application June 16, 1937, Serial No. 148,623
In Austria June 20, 1936

2 Claims. (Cl. 20—92)

This invention relates to fastening means for detachably connecting together wooden structural elements, and more particularly parts of furniture, at the corners, and consists essentially in the provision of an angle piece consisting of section iron or other suitable material to the one flange or wing of which there are attached one or more pins or pegs disposed parallel to the other wing and having transverse holes drilled therethrough for the reception of anchoring screws. In use the fastening contrivance is placed against the corner formed between two structural elements to be assembled, with the said pins extending into sockets drilled to receive them in the structural elements to be assembled, after which anchoring screws are inserted through the transverse holes in the pins to hold the assembly together. Instead of screws, any other suitable securing elements may be used for the purpose of the described anchoring.

The fastening means according to the invention, for the assembling of wooden structural elements, has the advantage of extreme simplicity, and permits at any time of the ready assembling and dismantling of structural elements joined together at the corners, more particularly in the case of furniture. The invention thus provides a substitute for the usual rigid and permanent assembling of corners by dovetailing.

A form of construction embodying the invention, is shown, by way of example, diagrammatically, in the accompanying drawing, in which:—

Figure 1:
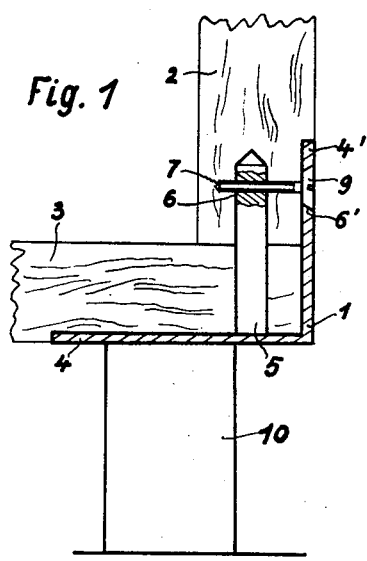
Fig. 1 shows the corner fastener according to the invention in vertical section.
Figure 2:
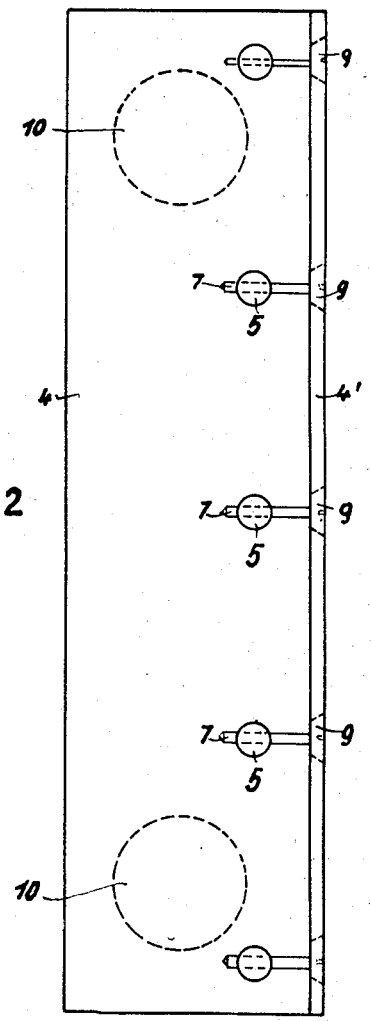
Fig. 2 shows the same in plane view with the wooden structural elements removed.
Figure 3:
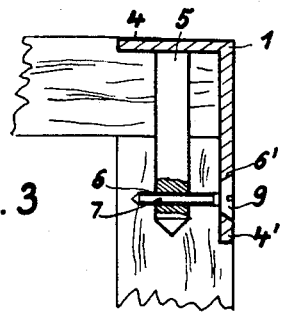
Fig. 3 shows a modified form of the fastener in sectional elevation.

Referring more particularly to Figs. 1 and 2, the fastener according to the invention consists of an angle piece 1, of metal or other suitable material, adapted to be placed against the corner formed by two abutting wooden structural elements 2, 3, for example the bottom and side wall of a cabinet. The lower flange or wing 4 of the angle piece is provided, according to the breadth of the elements (boards) to be assembled, with one or more pins or pegs 5 which are disposed parallel to the other wing 4' of the angle piece. The pins 5 are inserted in appropriate holes or sockets in the wooden elements 2, 3, and are each provided near the outer end with a transverse hole 6 for the reception of an anchoring screw 7 or the like. The screw 7 is screwed in from the outside through the wing 4' of the angle piece and through the wood of the board 2, and holds fast both the board 2 and also the board 3 disposed therebeneath. In this manner a thoroughly rigid and permanent corner joint, which is nevertheless easily detachable, can be made with the aid of a small number of screws. After removal of the anchoring screws 7, the piece of furniture or the like may easily be taken apart, and equally easily assembled again later. The lower wing 4 of the angle piece may also at the same time be used for the attaching of the feet or legs 10 of the piece of furniture, if such be provided. In this case the wing 4 of the angle piece is made somewhat wider than it otherwise need be. If the fastener is to be used solely for making a corner joint (for instance at the upper corners of a piece of furniture) it is sufficient, as shown in Fig. 3, to make the wing or flange 4 only just wide enough to enable the dowel pins 5 to be reliably attached thereto by soldering, welding, or the like.

The pins 5 may be of round or polygonal cross-section, and if desired may be provided with a pointed tip to facilitate penetration into the wood. It is advisable to make the holes in the wing 4' of the angle piece so large that the head 9 of the anchoring screw 7 can be countersunk so that it is not noticeable from the outside.

I claim:

1. A fastener for the detachable joining together of wooden structural elements, more particularly in furniture, comprising a length of angle section material adapted to be applied to the outside of a right angle butt joint, at least one dowel pin rigidly attached to the inside of one of the flanges of said section and extending parallel to the other flange of said section, the outer end portion of said dowel pin and the said flange disposed parallel to said pin being transversely drilled with holes in alignment with each other, and an anchoring element adapted to fit the said holes and to extend therethrough and through the intervening portion of said structural elements when assembled.

2. A fastener for the detachable joining together of wooden structural elements, more particularly in furniture, comprising a length of angle section material adapted to be applied to the outside of a right angled butt joint, at least one downel pin rigidly attached to the inside of one of the flanges of said section and extending parallel to the other flange of said section, the outer end portion of said dowel pin being transversely drilled at right angles to the said flange disposed parallel thereto, and screw threaded, and the said flange disposed parallel to the said dowel pin being drilled transversely in alignment with said screw threaded hole in said dowel pin, and countersunk on the outer side, and an anchoring screw adapted to extend through said flange and adjoining structural element and to be screwed into engagement with said threaded hole in said dowel pin.

ELLA MAX.